July 31, 1945.   F. E. TERRILL   2,380,619
STEERING MECHANISM FOR TRACTOR CRANES
Filed July 30, 1941   5 Sheets-Sheet 4

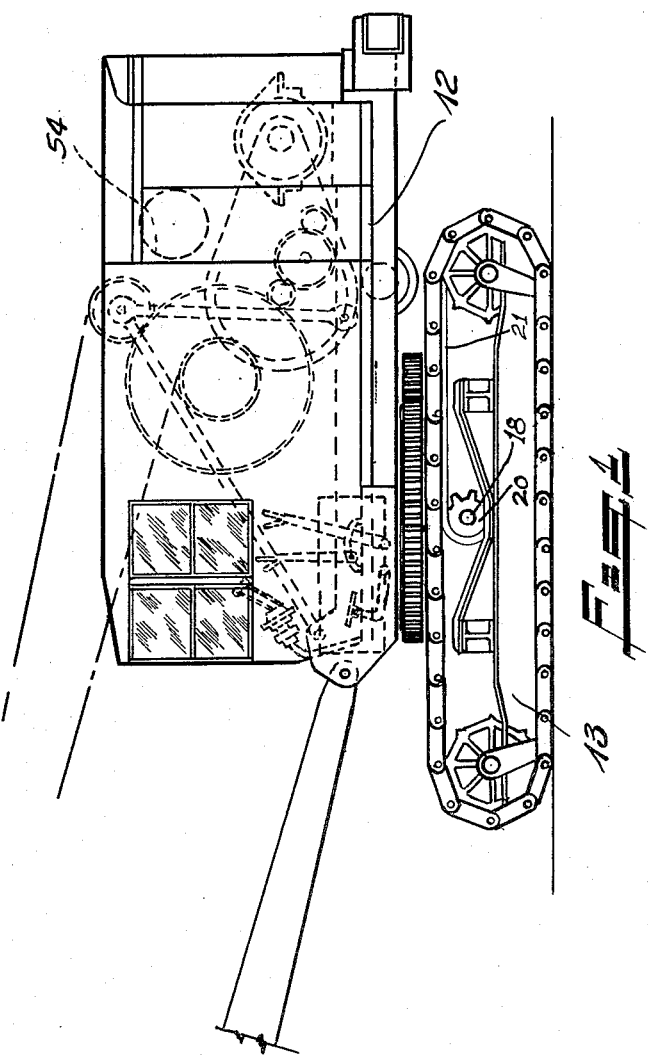

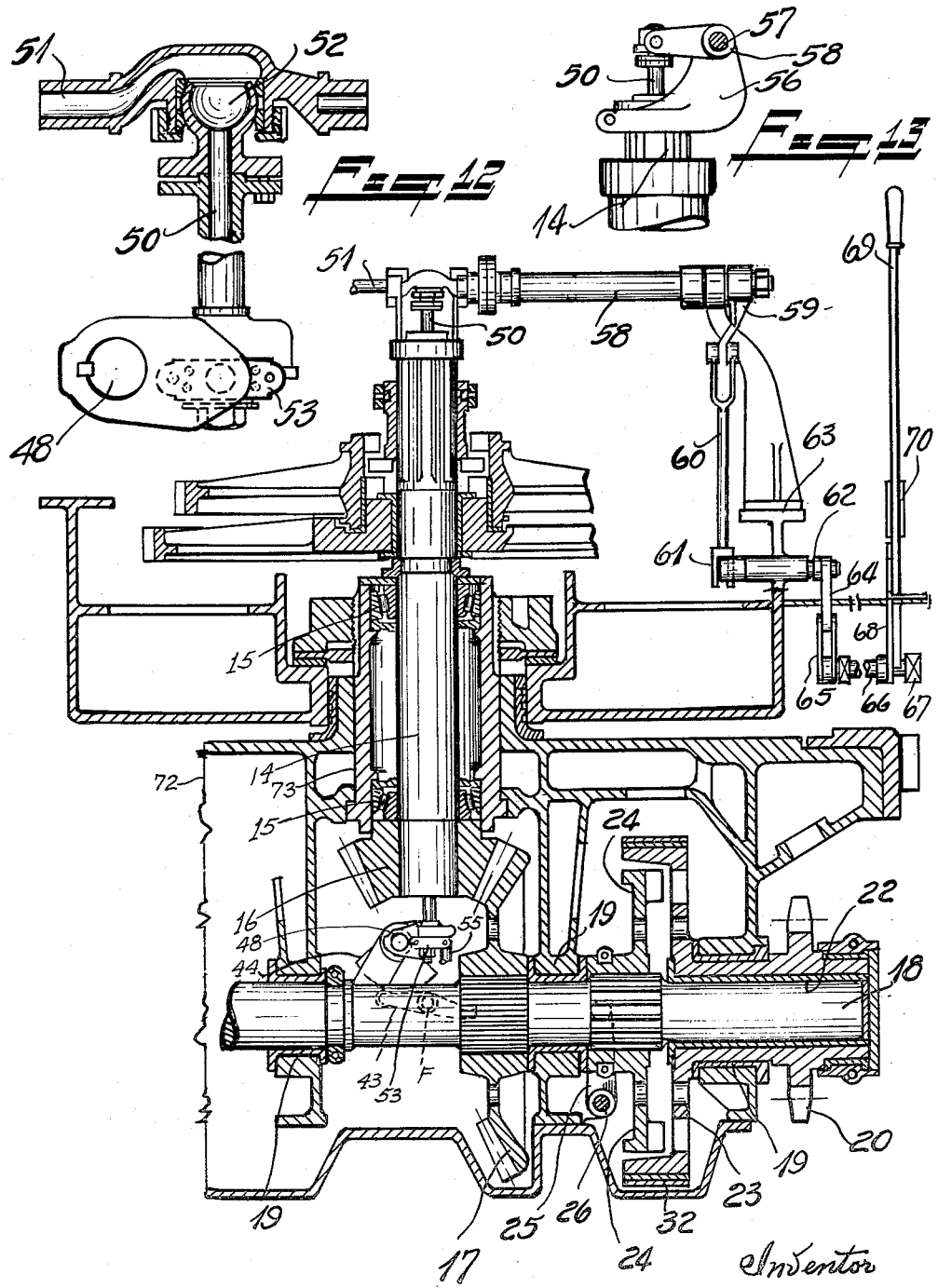

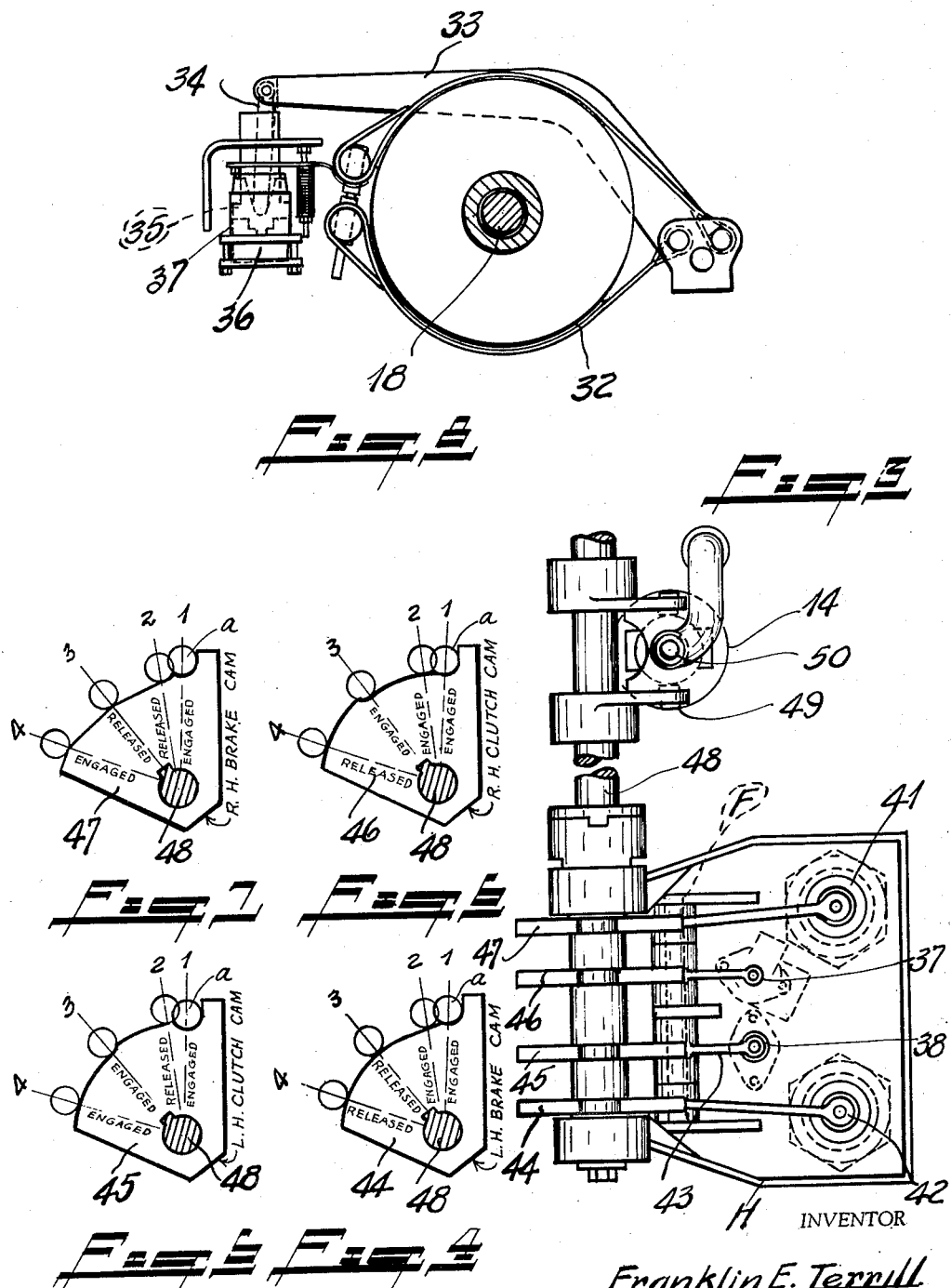

Inventor
Franklin E. Terrill.
BY Frank C. Scarmon.
ATTORNEY.

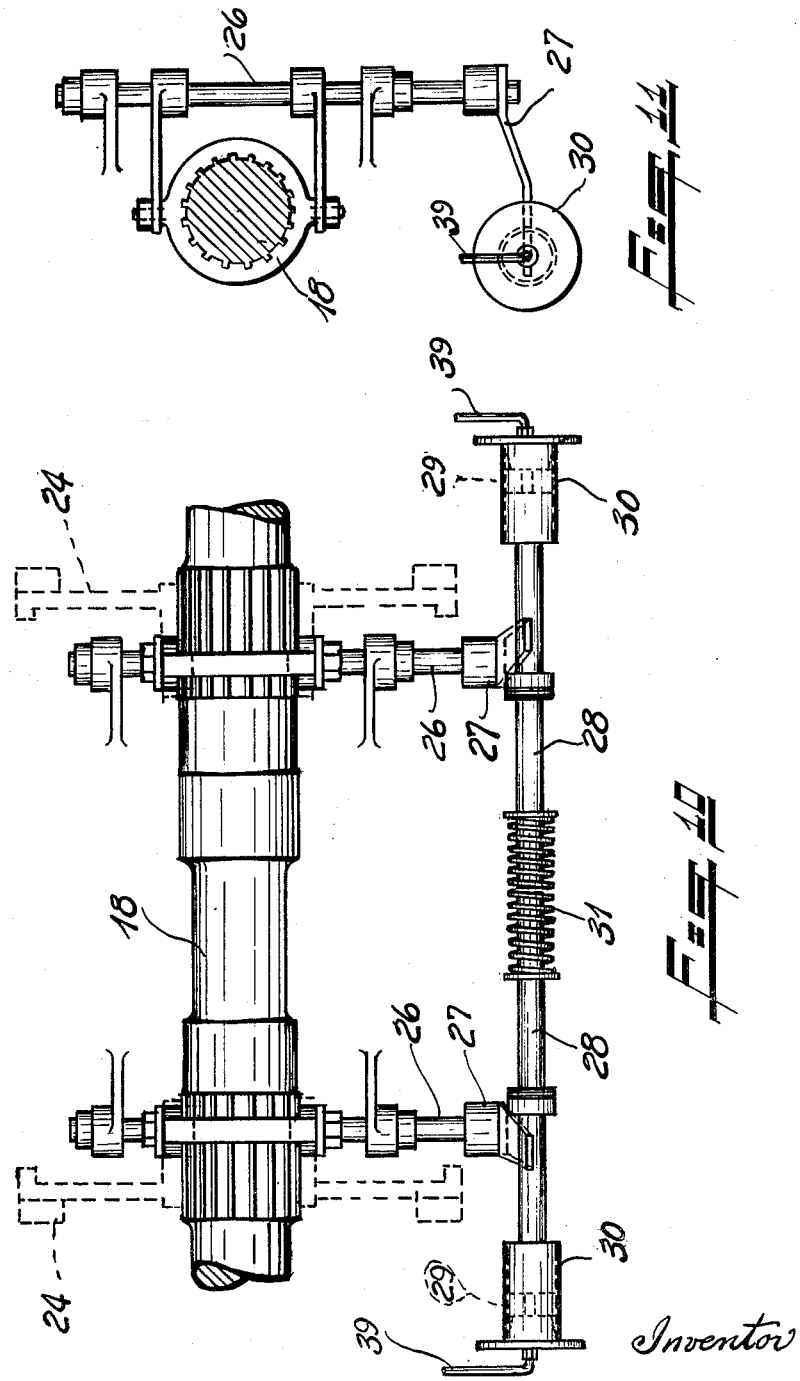

Patented July 31, 1945

2,380,619

UNITED STATES PATENT OFFICE 2,380,619

STEERING MECHANISM FOR TRACTOR CRANES

Franklin E. Terrill, Bay City, Mich., assignor to Industrial Brownhoist Corporation, Bay City, Mich., a corporation of Ohio Application July 30, 1941, Serial No. 404,689

19 Claims. (Cl. 180—9.2)

This invention relates to tractor cranes which are provided with endless track laying belts or crawlers supporting the car body and on which is carried a turntable or platform on which the work performing equipment and travel control means is mounted for convenient operation by the operator.

One of the prime objects of the invention is to provide a fluid power means for controlling the brakes and clutches on the car body, said control means extending through the vertical pivotal shaft connection between the revolvable platform and the car body.

Another object is the provision of an improved steering arrangement between the turntable and the car body including a one lever control to provide greater ease and facility of steering control than heretofore possible on large machines of this type and classification.

A further object is to provide a vertical, hollow travel shaft between the car body and the turntable together with a rockable cam shaft on the car body and operable by a vertically movable member extending through the hollow travel shaft, the cam shaft controlling fluid valves for admitting fluid to cylinders for controlling the clutch and brake mechanism.

A still further object is to control the clutch and brake mechanism from a single lever on the platform on the machine, and to supply fluid pressure through the pivotal connection between the platform and the car body.

A further object still is to provide a fluid brake control for the crawlers and also fluid controlled clutches whereby the crane may be steered by driving and positively held as to either crawler and easily released all through the manipulation of a single lever controlling a vertically movable member extending through the pivotal shaft of the machine.

With the above and other objects in view, the invention resides in the combination and arrangement of parts as hereinafter set forth, shown in the drawings, described and claimed, it being understood that changes in the precise embodiment of the invention may be made without departing from the spirit of the invention.

In the drawings:

Fig. 1 is an elevation of a crawler tractor and embodying my invention;

Fig. 2 is an enlarged vertical sectional view showing the vertical travel shaft and the drive mechanism associated therewith;

Fig. 3 is an inverted plan view of the rockable cam shaft, etc.;

Fig. 4 is a view of the left-hand brake cam;

Fig. 5 is a view of the left-hand clutch cam;

Fig. 6 is a view of the right-hand clutch cam;

Fig. 7 is a view of the right-hand brake cam;

Fig. 8 is an enlarged view showing one of the brake wheels and bands, etc.;

Fig. 10 is a fragmentary plan view showing the clutch actuating assembly;

Fig. 11 is a transverse sectional end view;

Fig. 12 is a part sectional fragmentary view of the vertical travel shaft and rod illustrating the universal connections at the ends thereof; and Fig. 13 is an enlarged fragmentary detail showing the rod reciprocating means.

Figure 9:
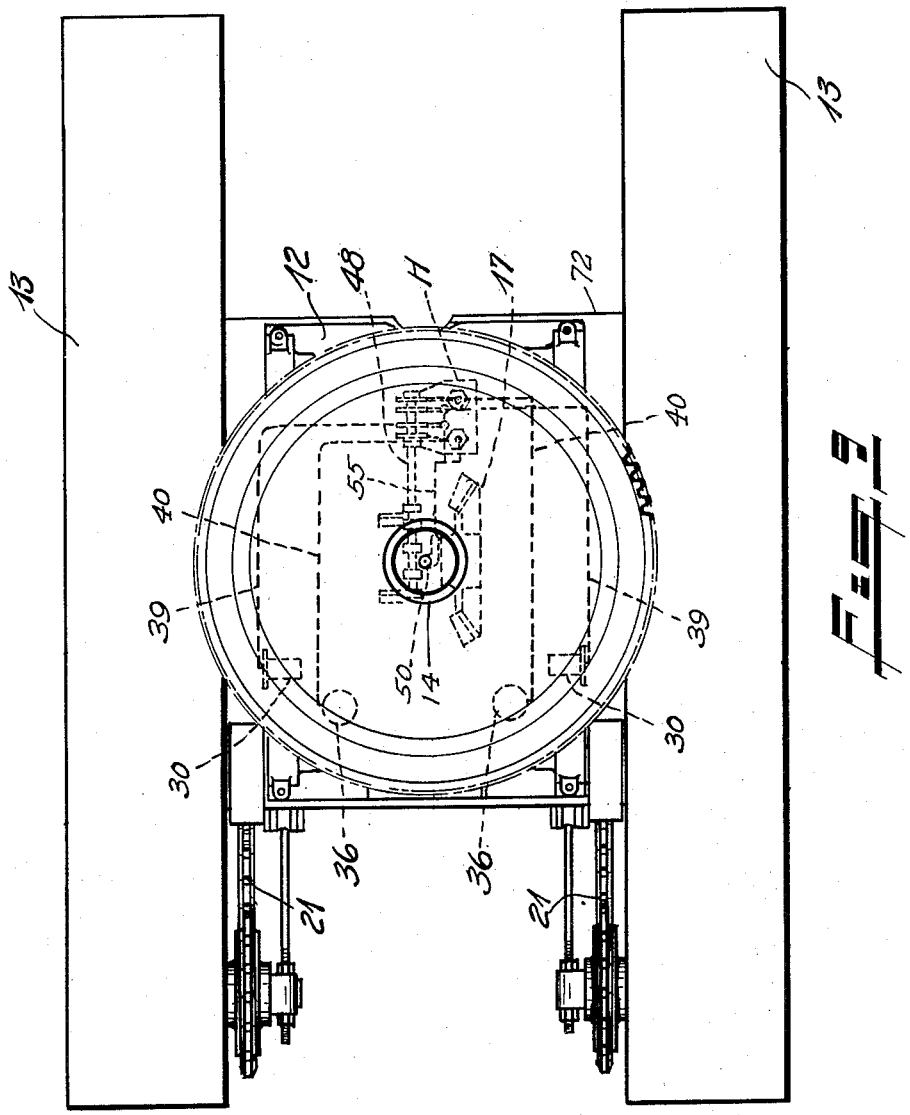
Fig. 9 is a diagrammatic plan view showing the air line connection to the brake and clutch cylinders.

Referring now more particularly to the drawings, the numeral 12 designates the main body of the crawler crane and 72, the non-revolving part of the frame which is supported on ground engaging creepers 13 for support and travel as usual. A hollow, vertical travel shaft 14 is journaled in vertically spaced bearings 15 provided in the center pin 73 which is in turn mounted in the main body 72 and a bevel gear 16 is provided on the lower end of said travel shaft meshing with and driving a bevel gear 17 carried by the horizontal travel shaft 18 which is in turn journaled in bearings 19 provided in the main frame. The outer ends of the horizontal travel shaft 18 are provided with the usual sprockets 20, and have endless chains 21 extending thereover, all of which is old structure.

The sprockets 20 are carried by sleeves 22 rotatably mounted on the outer ends of the horizontal shaft 18 and are provided with female clutch members 23 with which the male clutch members 24 cooperate. The male clutch members are slidably keyed on the shaft 18 so they can be moved to clutched or de-clutched position. The male clutch members 24 are controlled by clutch forks 25 carried by rock shaft 26; therefore, it will be seen by manipulating the clutches either sprocket 20 may be rotated or both for propulsion or maneuvering purposes.

The clutch shafts 26 are rocked by levers 27 which have their ends extending into the path of enlargements on reciprocating shafts 28, the outer ends of said shaft being provided with pistons 29 in air cylinders 30. A centering spring 31 is provided for returning the reciprocating shafts 28 to normal position after an operation thereof, and the air cylinders 30 are controlled from the platform as will be hereinafter described.

Extending around the female clutch members 23 are contractible brake bands 32, which may be utilized for a braking operation. The brake bands 32 are controlled by levers 33 which have a link connection 34 to a piston 35 within an air brake cylinder 36. Therefore, it will be seen that the operator can manipulate the clutches and brakes through fluid control means from the platform and thereby obviate the use of manually operated means at present in general use. The right-hand clutch is controlled through a clutch valve 37 and the left-hand clutch through a clutch valve 38, which supply fluid pressure to the clutch cylinders 30 through the pipe lines 39. Fluid pressure is supplied to the right- and left-hand brake cylinders 36 through pipe lines 40 which communicate with the valves 41 and 42, respectively. All of these valves are controlled by mechanism hereinafter set forth.

The clutch valves 37 and 38 are controlled by rock levers 43 which are mounted on the shaft F which is in turn journaled in the valve housing H, one of their arms terminating beneath cams 44, 45, 46, and 47; and these cams are mounted on a cam shaft 48 beneath the vertical shaft 14, and which cam shaft is adapted to be rocked for rocking the cam. The shapes of the cams will vary the sequence of operation of the various air cylinders according to their profile.

Pivotally connected at 49 to the cam shaft 48 is an upwardly extending tubular rod 50, adapted to be reciprocated, and this rod also forms a conduit for fluid pressure from the fluid pressure line 51, which line is connected to a swivel joint 52 at the upper end of the tubular rod 50, said joint permitting full 360° rotation as well as movement in other planes. Another universal joint 53 is provided at the lower end of the rod 50 to allow freedom of upward and downward movement for the cam shaft rocking operation to compensate for the rotative movement between the cab body and the turntable, as well as compensating for wear or misalignment, and any rocking movement of the platform with relation to the crawler frame.

The fluid pressure is delivered from the reservoir 54, passes from the pipe 51 at the upper end of the tubular shaft 50 through pipe 55 to the clutch and brake valves 37, 38, 41, and 42.

A bracket 56 is provided at the upper end of the shaft 14 and supports one end of a steering control shaft 57 which is journaled in the clutch shifter sleeve 58. An arm 59 is provided on the end of the steering shaft 57 and is connected to a connecting rod 60, the lower end of the rod being connected to a link 61 which is in turn mounted on the shaft 62 provided on the platform 63. An arm 64 is provided on the opposite end of the shaft 62, and is in turn connected to the arms 65 which are mounted on the one end of a rock shaft 66, said shaft being journaled in bearings 67, and a link 68 operatively connects the rock shaft with the hand shifting lever 69 which is pivotally mounted on the cheek plate 70, and connected to the link 68 in the usual manner. Links 71 connect the control shaft to the upper end of the rod 50, and it will be obvious that manipulation of the lever 69 will actuate the steering shaft 57 which is connected to the steering rod so that the rod may be raised or lowered for manipulating the cam shaft 48 and its various cams which in turn manipulate the control valves.

It will be noted that the amount of manual effort necessary for operating the brakes and clutches is reduced to a minimum, and this is particularly advantageous when the crawler is in a hole or on an incline where the release of the brakes and application of the clutches is a laborious operation. At the same time the control of the mechanism is through the pivotal shaft between the carriage and the platform.

The jaw clutches 23 are spring set and air released and the brakes 32 are air set and counterweight released, the profile of the cams governing the opening and closing of the valves for supplying the fluid. Referring particularly to Figs. 3 to 7 inclusive of the drawings. For explanatory purposes, the rollers marked a are shown in several different positions, and these several positions are marked "engaged" and/or "released" to indicate the engagement or disengagement of the brakes and clutches when digging, driving, or turning and when the roller a is in position as indicated at 1 in Figs. 3 to 7, the machine is ready for digging operations, the steering brakes are applied, and both steering clutches are set for driving. Now when the cam is shifted to position indicated at 2, the machine is ready for steering to the left, the left-hand brake is applied while the right-hand brake is released, the right-hand clutch is engaged while the left-hand clutch is released; and with the mechanism so manipulated, the machine can be turned in a very short radius.

When the cams are moved to position as indicated at 3, the machine may be driven straight ahead; and under such conditions both brakes are released and both clutches are engaged. When the cams are moved to position indicated at 4, the machine can be steered to the right. The right-hand brake is engaged and the left-hand brake is released, the left-hand clutch being engaged while the right-hand clutch is released. When the brake valve operates between positions 3 and 4, the right-hand brake will be permitted to slip and the left-hand brake will be fully released. The left-hand clutch will be engaged and the right-hand clutch will be released. This setting permits the machine to be turned over a large radius, because the one brake is permitted to slip, and this is accomplished by regulation of the fluid pressure. To turn in the opposite direction, the setting is reversed.

What I claim is:

1. A steering by driving mechanism for land vehicles comprising a mobile structure; a pivotal platform structure above the mobile structure; a vertical drive shaft connecting the platform structure and mobile structure; a driven shaft carried by the mobile structure; a drive connection between the drive shaft and the driven shaft; traction elements carried by the driven shaft; clutch and brake mechanism mounted on the driven shaft; fluid cylinders for selectively controlling said clutch and brake mechanism; a pressure tank carried by the platform structure; control valves connected to said pressure tank, and controlling the fluid cylinders; a rockable cam shaft adjacent the valves; cams carried by said cam shaft and controlling said valve; and means reciprocally mounted in the vertical shaft and controlled from the platform for rocking said cam shaft.

2. A device as set forth in claim 1 comprising a single lever mounted on the platform and a leverage connection between said lever and the upper end of the reciprocally mounted means.

3. The combination with a vehicle comprising a mobile structure; a platform above the mobile structure; a vertically disposed drive shaft carried by the platform and driving the mobile structure and also forming the pivotal connection between the mobile structure and the platform; fluid clutch and brake control valves for steering and travel mounted on the mobile structure, a pressure reservoir mounted on the platform, a fluid carrying vertical control rod, universally connected at its upper and lower end and mechanically operating said valves to control the distribution of the fluid power for steering and traveling.

4. The combination with a vehicle comprising, a frame; a traction drive shaft carried by said frame; brake and clutch elements mounted on said drive shaft; a vertical shaft extending upwardly from the frame and having driving connection with the traction drive shaft; a platform rotatably mounted on said frame and vertical shaft, said vertical shaft rotatably connecting said frame and platform; of manually operable control means extending through the vertical shaft and supplying fluid power for operating said clutch and brake elements; fluid control cylinders for said elements; a reservoir; a conduit connecting said reservoir and cylinders; valves connected with said cylinders; a cam shaft adjacent the drive shaft, cams on said shaft and controlling the valves for various operations thereof, said control means comprising a vertically reciprocable hollow rod extending through the vertically disposed shaft and connected to the cam shaft for rocking it to various positions, and means for reciprocating said rod.

5. The combination with a vehicle of the class described comprising, a mobile frame structure having a driven shaft; a vertically disposed hollow drive shaft; a platform pivotally mounted about the vertical drive shaft; fluid operated clutch and brake members carried by the driven shaft and controlling traction members for steering by driving operations; means for controlling the brake and clutch mechanism from the platform comprising a pressure tank on the platform; control valves on the mobile frame for regulating the flow of fluid from the pressure tank; a vertical control rod extending axially through the vertically disposed shaft; manually actuated means on the platform for operating said control rod; and means for supplying pressure from the pressure tank through the vertical control rod.

6. A steering by driving mechanism for land vehicles comprising a mobile structure; a rotatable platform above the mobile structure; a vertical drive shaft; a driven shaft carried by the mobile structure; a drive connection between the drive shaft and the driven shaft; traction elements associated with the driven shaft; clutch and brake elements mounted on the driven shaft; fluid cylinders for selectively controlling said clutch and brake elements; a pressure tank on the platform; control valves connected to the pressure tank and controlling the fluid cylinders; a rockable cam shaft adjacent the valves; cams on the cam shaft and controlling said valves; and reciprocal means within the vertical shaft for actuating said cam shaft and comprising a tubular member on the axis of the vertical shaft, the upper end being connected to said pressure tank, and the lower end leading to the cam operated valves for controlling fluid pressure to said valves.

7. The combination with a vehicle comprising a mobile frame; a platform above the frame; a vertically disposed hollow drive shaft carried by the platform for driving said mobile frame; of fluid clutch and brake control mechanism for said mobile frame comprising fluid cylinders in connection with said control mechanism; a pressure storage tank; control valves connected to said tank for supplying the cylinders and controlling the flow and exhaust of fluid therefrom; a plurality of cams controlling said valves; and means for controlling said cams selectively through control mechanism mounted on the platform and extending through the vertically disposed shaft on the axis thereof.

8. In a control device for a portable excavator, a frame; a rotatable platform mounted thereon; traction elements on said frame; means to drive said elements including a vertical drive shaft; means to steer said excavator; means to control said steering and operable in any rotational position of the platform; means to connect said means to steer and said means to control said steering which includes a single combination pressure fluid line and control rod extending through said shaft; a pressure storage tank mounted on the platform; valves mounted on the frame and connected to said tank, said vertical control rod being universally connected at its upper end and mechanically operating said valves to control the distribution of fluid power for steering and travel.

9. In a control device for a portable excavator, a frame; a rotatable platform on said frame; traction elements on said frame; means to drive said elements including a vertical drive shaft; means to steer said excavator; means to control said steering and operable in any rotational position of the platform; means to connect said means to steer and said means to control said steering which includes a single fluid pressure line extending through said shaft; a rotary coupling adapted to transmit fluid pressure in any rotational position of the coupling and the platform; a pressure tank connected to the upper end of said line, control valves connected to the lower end; and means for mechanically operating said valves to control the distribution of fluid power.

10. The combination defined in claim 9 in which the fluid pressure line serves also as a control rod for mechanically operating the valves.

11. A steering by driving mechanism for land vehicles comprising a mobile structure; a pivotal platform structure above the mobile structure; a vertical drive shaft between the platform structure and mobile structure; a driven shaft carried by the mobile structure; means for steering said mobile structure; fluid containers for operating said steering means; a pressure tank carried on the platform; fluid control valves on the mobile structure; a rockable shaft adjacent the valves; means carried by said shaft for controlling said valves; and reciprocally mounted means for actuating said shaft.

12. The combination defined in claim 11 in which the reciprocally mounted means comprises a control rod provided in the vertical drive shaft for rocking said shaft.

13. A steering by driving mechanism for self-propelled structures comprising a frame structure; a vertical drive shaft connecting the frame structure and the platform; a driven shaft on the frame structure; traction elements drivingly connected to the driven shaft; clutch and brake elements mounted on the driven shaft; fluid cylinders for selectively controlling said clutch and brake elements; a pressure tank on the platform; control valves connected to said tank and controlling said cylinders; a rockable shaft; means on said shaft for controlling said valves; means reciprocally mounted in the vertical shaft for rocking the rockable shaft; and means for supplying fluid pressure through said reciprocally mounted means.

14. A steering by driving mechanism for land vehicles comprising, a frame; a rotatable platform mounted thereon; a vertical drive shaft; a driven shaft on said frame; a drive connection between the vertical drive shaft and the driven shaft; traction elements associated with the driven shaft; brake and clutch elements connected to the traction elements, pressure chambers connected thereto; a pressure tank on said rotatable platform; a fluid pressure conduit between the frame and platform; control valves carried on the frame and connected to said tank and to said pressure chambers; and means on the rotatable platform for manually actuating said control valves.

15. A construction as defined in claim 14 in which the fluid pressure conduit contains a single fluid line.

16. A construction as set forth in claim 14 in which the fluid pressure conduit serves as the mechanical connection for manually actuating the control valves.

17. The combination with a vehicle comprising, a mobile frame structure, a platform above the mobile frame, a vertically disposed drive shaft carried by the platform, a driven shaft drivingly connected to the vertical drive shaft and driving said mobile frame structure, traction elements associated with the driven shaft, clutch and brake elements connected thereto, a pressure reservoir mounted on the platform, fluid control valves mounted on said mobile structure and connected to said reservoir and to said clutch and brake elements for steering and travel, and a fluid carrying vertical control rod for actuating said valves.

18. The combination as defined in claim 17 in which the fluid carrying control rod allows fluid pressure transmission in any rotational position of the platform.

19. The combination with a vehicle comprising a mobile structure, a platform above the mobile structure; a vertically disposed drive shaft carried by the platform and driving the mobile structure and also forming the pivotal connection between the crawler structure and the platform; fluid clutch and brake control valves for steering and travel mounted on the mobile structure, a pressure reservoir mounted on the platform, and a fluid carrying vertical control rod for mechanically operating said valves, said rod being connected at its upper end to the pressure tank to allow fluid pressure transmission in any rotational position of the platform.

FRANKLIN E. TERRILL.